Sept. 20, 1966   E. K. HEINE   3,274,370

HIGH FREQUENCY WELDING APPARATUS

Filed Jan. 3, 1964

United States Patent Office 3,274,370
Patented Sept. 20, 1966

3,274,370
HIGH FREQUENCY WELDING APPARATUS
Eckhard Klaus Heine, Stockholm, Sweden, assignor to Olof Fridlund, Molndal, Sweden, a manufacturer
Filed Jan. 3, 1964, Ser. No. 335,494
Claims priority, application Sweden, Jan. 14, 1963, 399/63
3 Claims. (Cl. 219—10.53)

The present invention relates to electrical high frequency welding of thin plastic materials and is especially suitable in connection with welding in one single-step operation of very thin plastic films to each other and to a thicker plastic material.

High frequency welding of very thin P.V.C.-films has previously been connected with rather great difficulties due to the heat diverting problems. Of course, a compensation of heat diversion can in principle be obtained by an increase of the applied power, but too high power creates a danger of breakdown in the material to be welded and a following destruction of the product. For this reason devices for resistance heat welding have been previously used instead of high frequency welding devices.

The device according to this invention has however made it possible to use the principle of high frequency welding also in connection with materials with thicknesses below 0.1 mm. The device is intended for welding of thin plastic films to each other and to a thicker plastic material and the invention is mainly characterized by the one welding electrode being constituted of an L-shaped tool, where the one branch which is located closest to the thicker material and intended for the welding thereof to the thin plastic films is completely uncovered and where the other branch of the L-shaped tool which is intended for the welding of two thin plastic films to each other is covered by a rubber layer, the opposite welding electrode in both cases being covered by a layer of a material, which is isolating with respect to the high frequency to such an extent, that a break-down is avoided, and which is heat isolating and has a high loss-factor.

The invention will be more closely described in connection with the accompanying drawing, where FIGURE 1 illustrates a cover produced by an apparatus according to the invention;

Figure 1:
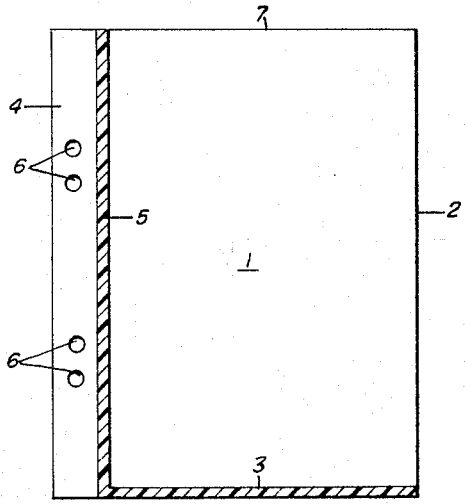

FIGURE 1 illustrates a cover consisting of a double-folded thin plastic film, the lower edge 3 of which is welded together and the right side of which is continuous due to the double-folding. The side 5, which is opposite to side 2, has its free edges welded together with an edge strip 4 of thicker material. The edge strip is here shown with punched holes for the insertion of the cover 1 in a collection case or the like.

Figure 2:
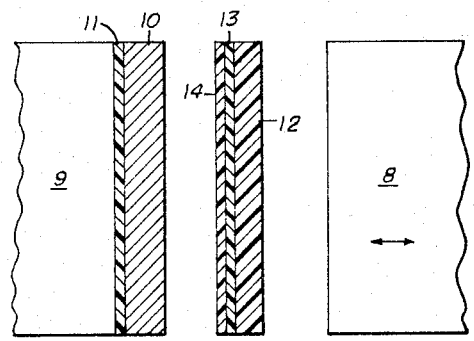
FIGURE 2 illustrates the position of the different layers in connection with that part of the L-shaped tool which is used for welding of the thin plastic films to a thicker material.

FIGURE 2 illustrates in principle the arrangement in connection with that branch of the L-shaped tool, which is intended for the welding of two thin plastic films both to each other and to a strip of thicker plastic material, the latter constituting a strengthening at that side of the completed plastic cover, which is to be inserted in a collection case or the like. The tool consists of a fixed and a movable part, the former suitably being used as counter-electrode. The movable part 8 is formed of any suitable electrically conducting material, e.g. copper, brass or aluminium, and is intended to come into direct contact with the plastic material during the welding operation. The fixed part or counter-electrode 9 is also formed of a suitable electrically conducting material, but it must, due to the appearing heat diversion problems in connection with the welding, be covered by a material 10, which is isolating with respect to the high frequency to such an extent, that a break-down is avoided, and which is heat isolating and has a high loss-factor. Materials well meeting these claims and proving to be very suitable for the subject purpose are pertinax and pressboard, which themselves due to their high loss-factors contribute to the heat generation necessary for the welding. It has been proved that in certain circumstances it has been suitable to insert a very thin layer of Teflon between the counter-electrode and the pressboard sheet. A correct choice of quality of pressboard can however make the Teflon layer superfluous.. The plastic sheets to be welded together are inserted between the electrodes in such a way, that the thicker edge strip will be on the side associated with the movable uncovered part where the high frequency is supplied during the welding. The reason for this is that the thin films then will be in the region, which is the center for the heat generation and where at the same time the best heat isolation is to be found.

The section of the movable part, which comes into direct contact with the edge-strip during the welding is suitably transversally rifled, the raised parts then constituting the active tool surfaces, where the welding will take place. When the movable part during the welding operation is pressed against the plastic layers arranged at the counter-electrode these extensions will be forced into the edge-strip and cause a corresponding impression thereof in the thin plastic films, the corresponding parts of which then will be welded together with the edge strip material by the generated heat. FIGURE 2 illustrates the principle of the positioning of the plastic layers between the electrodes, whereby the edge-strip is indicated by 12 and the thin plastic films constituting the cover itself are indicated by 13 and 14. The punched holes in the edge-strip are indicated by 6 and the upper edge of the cover, which is open, by 7 in FIGURE 1.

Figure 3:
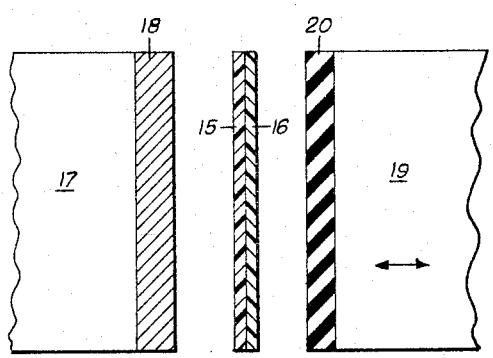
FIGURE 3 illustrates the position of the different units in connection with that part of the tool which is used for welding two thin plastic films together.

FIGURE 3 shows in principle that branch of the L-shaped tool, which is intended for the welding of two thin plastic films 15 and 16 to each other. Also here the counter-electrode 17 is covered by a thin sheet of pertinax or pressboard 18 in order to prevent the material to be welded from coming into direct contact with the electrode and to prevent heat diversion.

The movable part 19, to which the high frequency power is supplied, is covered by a rubber layer, the object of which is to create an even surface against the plastic films and together with the pressboard sheet to provide an optimal positioning of the films between the two electrodes both with respect to heat isolation and heat generation.

In practice the two parts 9 and 17 are combined in one L-shaped unit, which corresponds to the combined parts 8 and 19.

The tool can be arranged in any suitable manner, e.g. vertically, in which case the counter-electrode can act as working-table, over which the plastic materials are fed in suitable steps, or horizontally, in which case the plastic materials have to be fed vertically in between the electrodes. The feeding of the plastic materials can be performed in any suitable way and has not been described here as this is of no importance in connection with the present invention.

I claim:

1. High frequency welding apparatus for welding in one single operation step of a cover or the like of very thin double-folded pastic material, one edge of which has a thicker plastic edge-strip, characterized by the one welding electrode being constituted of an L-shaped tool, where the one branch which is located closest to the thicker material and intended for the welding thereof to the thin plastic films is completely uncovered and where the other branch which is intended for the welding of two thin plastic films to each other is covered by a rubber layer, the opposite electrode in both cases being covered by a layer of a material, which is isolating with respect to the high frequency to such an extent, that a break-down is avoided, and which is heat isolating and has a high loss-factor.

2. High frequency welding apparatus according to claim 1, characterized by the material covering the counter-electrode being pertinax or pressboard.

3. High frequency welding apparatus according to claim 1, characterized by a thin layer of Teflon being arranged between the pertinax or pressboard sheet and the counter-electrode at that part of the tool, which is intended to weld the thin films to the thicker edge-strip.

References Cited by the Examiner

UNITED STATES PATENTS 3,017,484    1/1962    England et al. _____ 219—10.53

FOREIGN PATENTS 815,819    10/1951    Germany.

RICHARD M. WOOD, *Primary Examiner.*

L. H. BENDER, *Assistant Examiner.*